United States Patent
Bone et al.

(10) Patent No.: US 9,210,174 B2
(45) Date of Patent: Dec. 8, 2015

(54) METHOD AND DEVICE FOR CONTROLLING ACCESS TO MOBILE TELECOMMUNICATIONS NETWORKS

(75) Inventors: Nicholas Bone, Thatcham (GB); James Raeburn, Newbury (GB)

(73) Assignee: VODAFONE IP LICENSING LIMITED, Newbury, Berkshire (GB)

(*) Notice: Subject to any disclaimer, the term of this patent is extended or adjusted under 35 U.S.C. 154(b) by 20 days.

(21) Appl. No.: 13/823,589

(22) PCT Filed: Sep. 14, 2011

(86) PCT No.: PCT/GB2011/051733
§ 371 (c)(1),
(2), (4) Date: Jul. 8, 2013

(87) PCT Pub. No.: WO2012/035349
PCT Pub. Date: Mar. 22, 2012

(65) Prior Publication Data
US 2014/0128028 A1     May 8, 2014

(30) Foreign Application Priority Data
Sep. 14, 2010 (GB) .................................. 1015325.2

(51) Int. Cl.
| | |
|---|---|
| *H04L 29/06* | (2006.01) |
| *H04W 8/22* | (2009.01) |
| *H04W 48/02* | (2009.01) |
| *H04W 12/08* | (2009.01) |

(52) U.S. Cl.
CPC ............ *H04L 63/101* (2013.01); *H04W 12/08* (2013.01); *H04W 48/02* (2013.01); *H04W 8/22* (2013.01)

(58) Field of Classification Search
CPC ..... H04W 12/00; H04W 12/06; H04W 12/08; H04W 12/12; H04W 88/02; H04W 8/20; H04W 8/26; H04W 8/265; H04W 8/183; H04W 8/245; H04W 4/001; H04L 63/0853; G06F 21/88; G06F 21/31; G06F 21/34; G06F 21/74; G06F 2221/2153; H04M 1/72525
USPC .............. 455/410–411, 422.1, 565, 551, 418
See application file for complete search history.

(56) References Cited

U.S. PATENT DOCUMENTS

| | | | |
|---|---|---|---|
| 5,809,413 A * | 9/1998 | Meche et al. ................. | 455/411 |
| 8,326,268 B2 * | 12/2012 | Ahn et al. ..................... | 455/411 |
| 2005/0280557 A1 | 12/2005 | Jha et al. | |
| 2007/0275739 A1 * | 11/2007 | Blackburn ................... | 455/466 |
| 2008/0186162 A1 | 8/2008 | Rajan et al. | |
| 2011/0077051 A1 * | 3/2011 | Brown et al. ................. | 455/558 |
| 2011/0081950 A1 * | 4/2011 | Guven .......................... | 455/558 |
| 2011/0261777 A1 * | 10/2011 | Maeda et al. ................. | 370/329 |

FOREIGN PATENT DOCUMENTS

EP     2 059 082     5/2009

OTHER PUBLICATIONS

International Search Report for PCT/GB2011-051733 dated Dec. 29, 2011.

* cited by examiner

*Primary Examiner* — Brandon Miller
*Assistant Examiner* — Umair Ahsan
(74) *Attorney, Agent, or Firm* — Workman Nydegger

(57) ABSTRACT

To control access by any given mobile terminal to a mobile telecommunications network, a smartcard (i.e. a SIM) is arranged to include a list of device identifiers corresponding to one or more mobile terminals together with an indication of their respective access categories (i.e. black-list, grey-list or white-list). This list is constructed from an updated list of identifiers of mobile devices into which the smartcard has been inserted. This may be enhanced with a limited number of generic excluded identifiers. The smartcard thus maintains a local database of banned devices and/or devices that need to be monitored by the network.

17 Claims, No Drawings

METHOD AND DEVICE FOR CONTROLLING ACCESS TO MOBILE TELECOMMUNICATIONS NETWORKS

CROSS REFERENCE TO RELATED APPLICATIONS

This application is a U.S. Nationalization of International Application Number PCT/GB2011/051733, filed on Sep. 14, 2011, which claims priority to United Kingdom Patent Application No. 1015325.2, filed on Sep. 14, 2010, the entireties of which are incorporated herein by reference.

FIELD OF THE INVENTION

The invention relates to a method for controlling access to a mobile telecommunications network by specific terminals.

BACKGROUND TO THE INVENTION

Where a mobile phone has been reported to a mobile network operator as stolen or missing, future access to that network (and potentially to other networks, where there is an agreement to share such information) can be prevented. To do this, a database, often part of the home location register (HLR) in the core network, is deployed. Access is denied, allowed or restricted to any given mobile phone depending upon the entry for that phone, if any, within that database. Such databases are generally referred to as equipment identity registers (EIR).

EIRs are typically arranged to hold records for three classes of mobile terminal; the classes are conventionally termed "black", "grey" and "white".

When a mobile requests services from the network, the signaling required to set up the required connection includes a message from the equipment containing a unique equipment identifier such as the IMEI (International Mobile Equipment Identity).

It is the IMEI that is stored in the relevant category of the EIR. Thus, in establishing a service, the IMEI may be checked against the EIR, to assess which equipment category the mobile phone falls into. A "black" device is one that has been reported stolen or whose operation on the network is otherwise determined to be undesirable for the network operator (for instance it may be unauthorized or in some way defective: it would be detrimental for network operation to allow a device that has malfunctioning power control). Black-listed mobiles will denied access to the network.

By contrast, grey mobiles would generally be allowed to use the network but they may be treated differently (their attempts to access the network might be logged and stored in a log file).

As might be expected, "white" mobiles are those that comply with network operator requirements.

Conventional EIRs are thus designed to blacklist individual stolen handsets. Blacklisting whole classes of devices (for example counterfeit, defective batch etc.) or specific terminals using compromised or undesirable versions of software (particularly operating system software) is not trivial and may be impractical.

Furthermore, EIRs are ineffective when the handset connects over non-mobile networks, or to networks which don't have EIRs, or don't have the IMEI on their black-list.

It has also been possible to work around black-listing by altering the IMEI carried by the equipment.

In some extreme cases, badly built terminals have the potential to damage the mobile telecommunications networks even before an IMEI is presented.

It is therefore an object of the invention to obviate or at least mitigate the aforementioned problems.

SUMMARY OF THE INVENTION

In accordance with an aspect of the invention, there is provided a method for controlling access to a mobile telecommunications network by specific terminals, the method comprising, in a smartcard for insertion in a mobile terminal:

providing an internal pattern that lists device identifiers corresponding to one or more mobile terminals, said internal pattern including an indication of the access class for each of the listed device identifiers, determining identification information unique to a mobile terminal, said information including a device identifier and software version data, comparing the determined identification information with the internal pattern, and permitting access to a mobile telecommunications network by the mobile terminal in accordance with the results of the comparison.

The smartcard is preferably a SIM card.

As a result of the present invention, SIMs themselves are able to refuse to work in a "bad" device (e.g. one with faulty radio or software version, known malware problems etc.).

In accordance with a further aspect of the invention, there is provided a smartcard implementing the method described above.

In combination with the network based EIR, many more undesirable uses of mobile telecommunications equipment may be prevented with limited alteration of network components.

DETAILED DESCRIPTION

In the present invention, a SIM uses a SIM application toolkit command ("Provide Local Information", see 3GPP TS 11.14) to determine the full terminal IMEI including software version, and compare this with an internal pattern.

The internal pattern is a list of IMEIs with which the SIM has initially been provided or to which it has subsequently been associated (the category of those latter numbers being determined by the network and then the SIM list updated).

There can be a mixture of black, white and grey-listing. If "white", then the SIM works as usual. If "black" then the SIM shuts down and the terminal will then show an error message (e.g. "Insert valid SIM") and typically refuse to connect to any network. If "grey" then the SIM allows a temporary connection so it can report to a mobile network and gain further information. If there is no info within a pre-set time window, it treats as "black".

One clear advantage is that the SIM won't need an EIR with the number of entries typical for a whole network. Instead the SIM-based list will be effective with only a limited set of rules covering terminals it has been inserted into so far and a few "globally bad" patterns (like all zero or other constant IMEIs). These rules can of course be updated by the network. In certain circumstances, the SIM could itself be barred.

In certain embodiments a terminal may be grey-listed (or even black-listed) automatically if the terminal does not properly support SIM toolkit.

Alternatively or additionally, a secure channel or USB "plug and play" behaviour (over high speed interface) may be used to identify and/or authenticate the terminal. Failure to build the secure channel (i.e. terminal can't be authenticated) could then result in grey-list or black-list treatment.

In a further embodiment, the SIM reports directly to the terminal itself if the terminal has been stolen, or is "bad" in some other catastrophic way, (e.g. custom error message, which could be tailored to the terminal type). The terminal could then shut down or go into a safe mode requiring authorized unlock, regardless of whether the SIM reporting the theft is then removed.

Using permutations or combinations of the above embodiments with or without the cooperation of the network based EIR, may prevent catastrophically bad terminals from even attempting to connect to a network (and hence causing damage).

The invention claimed is:

1. A method for controlling access to a mobile telecommunications network, the method comprising:
    determining identification information of a mobile terminal by a smartcard inserted therein, the identification information including a device identifier, the mobile terminal being one of a plurality of mobile terminals into which the smartcard has been inserted;
    comparing, by the smartcard, the determined identification information with an internal pattern stored on the smartcard, the internal pattern comprising a list of device identifiers corresponding to the plurality of mobile terminals, the internal pattern including an indication of an access class for each of the listed device identifiers;
    permitting or denying the mobile terminal access, by the smartcard, to the mobile telecommunications network in accordance with the results of the comparison, wherein the mobile terminal is authenticated to access the network, and wherein failure to authenticate the mobile terminal results in a change of the access class in the internal pattern for the device identifier corresponding to the mobile terminal.

2. A method as claimed in claim 1, wherein the identification information further includes software version data.

3. A method as claimed in claim 1, wherein the identification information is unique to the mobile terminal.

4. A method as claimed in claim 1, wherein the smartcard is a subscriber identity module (SIM), the device identifier is an international mobile equipment identity (IMEI) number and the internal pattern is a lookup table of IMEIs corresponding to the plurality of mobile terminals along with respective access class indication.

5. A method as claimed in claim 1, wherein access to the mobile telecommunications network is denied automatically if the mobile terminal does not properly support SIM toolkit.

6. A method as claimed in claim 1, wherein the smartcard reports directly to the mobile terminal that the mobile terminal is stolen.

7. A method as claimed in claim 1, wherein the mobile terminal shuts down or enters a safe mode requiring authorized unlock in response to the comparison step.

8. A method as claimed in claim 1, wherein contents of the internal pattern are initially determined by the mobile telecommunications network and the internal pattern is subsequently updated by the smartcard when the smartcard is inserted in the mobile terminal.

9. A smartcard for controlling access to a mobile telecommunications network by specific terminals, the smartcard implementing the method as claimed in claim 1.

10. The method recited in claim 1, wherein the list of the internal pattern further comprises additional device identifiers corresponding to mobile terminals not of the plurality of mobile terminals and the internal pattern further includes an indication of the access class for each of the additional device identifiers.

11. The method recited in claim 1, wherein the access class is selected from one of: black, gray, and white, wherein black signifies no network access, gray signifies some network access, and white signifies full network access.

12. The method recited in claim 4, wherein the lookup table IMEIs has fewer entries than the Equipment Identity Register (EIR) in the mobile telecommunications network.

13. The method recited in claim 6, wherein the smartcard provides a custom error message to the mobile terminal tailored to a terminal type of the mobile terminal.

14. The method recited in claim 7, wherein the mobile terminal remains shut down or within safe mode regardless of whether the smartcard is then removed.

15. The method recited in claim 1, wherein determining the identification information of the mobile terminal comprises:
    sending a request, by the smartcard, to the mobile terminal to send current local information corresponding to the mobile terminal; and
    subsequently receiving, by the smartcard, current local information corresponding to the mobile terminal.

16. The method recited in claim 1, wherein
    comparing the determined identification information with the internal pattern comprises determining the access class corresponding to the mobile terminal from the internal pattern, and
    permitting or denying the mobile terminal access to the mobile telecommunications network is dependent on the determined access class.

17. The method recited in claim 1, wherein the access class is one of black, grey, and white, and wherein permitting or denying the mobile terminal access to the mobile telecommunications network comprises:
    when the access class is black, denying, by the smartcard, the mobile terminal access to the mobile telecommunications network;
    when the access class is white, allowing, by the smartcard, the mobile terminal access to the mobile telecommunications network; and
    when the access class is grey, selectively allowing, by the smartcard, the mobile terminal access to the mobile telecommunications network.

* * * * *